(12) United States Patent
Zhu et al.

(10) Patent No.: US 11,874,907 B2
(45) Date of Patent: Jan. 16, 2024

(54) METHOD FOR ENHANCING FINGERPRINT IMAGE, IDENTIFYING FINGERPRINT AND STARTING-UP APPLICATION PROGRAM

(71) Applicant: ArcSoft Corporation Limited, Zhejiang (CN)

(72) Inventors: Mingming Zhu, Zhejiang (CN); Hua Lei, Zhejiang (CN); Jiacai Zhao, Zhejiang (CN); Li Mei, Zhejiang (CN); Jin Wang, Zhejiang (CN)

(73) Assignee: ArcSoft Corporation Limited, Zhejiang (CN)

( * ) Notice: Subject to any disclaimer, the term of this patent is extended or adjusted under 35 U.S.C. 154(b) by 197 days.

(21) Appl. No.: 17/041,465

(22) PCT Filed: Mar. 10, 2020

(86) PCT No.: PCT/CN2020/078648
§ 371 (c)(1),
(2) Date: Nov. 16, 2021

(87) PCT Pub. No.: WO2020/187098
PCT Pub. Date: Sep. 24, 2020

(65) Prior Publication Data
US 2022/0084319 A1 Mar. 17, 2022

(30) Foreign Application Priority Data
Mar. 15, 2019 (CN) .......................... 201910198302.7

(51) Int. Cl.
*G06V 40/13* (2022.01)
*G06T 7/194* (2017.01)
(Continued)

(52) U.S. Cl.
CPC .............. *G06F 21/32* (2013.01); *G06T 5/002* (2013.01); *G06T 5/006* (2013.01); *G06T 5/007* (2013.01);
(Continued)

(58) Field of Classification Search
CPC ......... G06F 21/32; G06T 7/194; G06T 5/002; G06T 5/006; G06T 5/007;
(Continued)

(56) References Cited

U.S. PATENT DOCUMENTS 5,995,642 A  11/1999 Hsu et al.
9,330,325 B2  5/2016 Shin et al.
(Continued)

FOREIGN PATENT DOCUMENTS

CN  1480898 A  3/2004
CN  101079102 A  11/2007
(Continued)

OTHER PUBLICATIONS

Senior A et al:"Improved fingerprint matching by distortion removal", IEICE Transactions on Information and Systems, Information & Systems Society, Tokyo, JP, vol. E84-D, No. 7, Jul. 1, 2001 (Jul. 1, 2001), pp. 825-831, xp002260232.
(Continued)

*Primary Examiner* — Stephen G Sherman
(74) *Attorney, Agent, or Firm* — Gang Yu

(57) ABSTRACT

An embodiment of the present disclosure provides a method for enhancing a fingerprint image, identifying a fingerprint, and starting-up a application program. The method for enhancing the fingerprint image includes: removing a background texture of a fingerprint image of a current frame to obtain a pure fingerprint image; performing a first preprocessing on the pure fingerprint image to obtain a first pre-processed image; obtaining an effective area of the first (Continued)

pre-processed image; performing direction field estimation and direction field correction on the effective area; and performing a second pre-processing on the effective area after direction field correction to obtain an enhanced fingerprint image. With the solution of this embodiment, the number of fingerprint collections is reduced, the quality of fingerprint images is improved, the complexity of fingerprint collection is reduced, the efficiency of fingerprint unlocking is improved, and the user experience is improved.

19 Claims, 7 Drawing Sheets

(51) Int. Cl.
  *G06F 21/32* (2013.01)
  *G06V 40/12* (2022.01)
  *G06T 5/00* (2006.01)
  *G06V 10/54* (2022.01)
  *G06V 10/30* (2022.01)
(52) U.S. Cl.
  CPC .............. *G06T 7/194* (2017.01); *G06V 10/30* (2022.01); *G06V 10/54* (2022.01); *G06V 40/1347* (2022.01); *G06V 40/1376* (2022.01); *G06T 2207/30196* (2013.01)
(58) Field of Classification Search
  CPC .......... G06T 2207/30196; G06V 10/54; G06V 10/30; G06V 40/1376; G06V 40/1347
  See application file for complete search history.

(56) References Cited

U.S. PATENT DOCUMENTS

| | | | | |
|---|---|---|---|---|
| 2003/0028784 A1* | 2/2003 | Uchida | ................. | G06V 40/30 |
| | | | | 713/186 |
| 2004/0042642 A1* | 3/2004 | Bolle | ...................... | G07C 9/32 |
| | | | | 382/115 |
| 2004/0175023 A1* | 9/2004 | Svedin | ..................... | G07C 9/38 |
| | | | | 382/124 |
| 2007/0223831 A1* | 9/2007 | Mei | ........................ | H04N 23/68 |
| | | | | 348/E5.046 |
| 2008/0016371 A1* | 1/2008 | Jiang | ....................... | G06V 40/13 |
| | | | | 713/186 |
| 2008/0095413 A1 | 4/2008 | Yau et al. | | |
| 2010/0266168 A1* | 10/2010 | Wang | .................. | G06V 40/1376 |
| | | | | 382/124 |
| 2012/0127179 A1* | 5/2012 | Aspelin | ................... | G06T 11/00 |
| | | | | 345/173 |
| 2017/0090028 A1* | 3/2017 | Djordjev | ............. | G01S 7/52079 |

FOREIGN PATENT DOCUMENTS

| | | |
|---|---|---|
| CN | 101609499 A | 12/2009 |
| CN | 102270297 A | 12/2011 |
| CN | 102609705 A | 7/2012 |
| CN | 102682428 A | 9/2012 |
| CN | 102999750 A | 3/2013 |
| CN | 103065134 A | 4/2013 |
| CN | 106342325 B | 8/2013 |
| CN | 103996026 A | 8/2014 |
| CN | 105205442 A | 12/2015 |
| JP | 2008276758 A | 11/2008 |
| JP | 2017138858 A | 8/2017 |
| JP | 2018177083 A | 11/2018 |

OTHER PUBLICATIONS

Search report of corresponding EP application No. 20774228.9.
Tariq Mahmood Khan, et al. "Efficient Hardware Implementation For Fingerprint Image Enhancement Using Anisotropic Gaussian Filte". IEEE Transactions on Image Processing. Feb. 20, 2017 (Feb. 20, 2017). vol. 26, Issue: 5, p. 2116-2126, https://ieeexplore.ieee.org/document/7859424.
Ekberjan Derman et al. "Normalized cross-correlation based global distortion correction in fingerprint image matching". 2016 International Conference on Systems, Signals and Image Processing (IWS-SIP). , IEEE, May 25, 2016 (May 25, 2016), p. 1-4, https://ieeexplore.IEEE.org/document/7502727.
Hadhoud M M et al:"An adaptive algorithm for fingerprints image enhancement using gabor filters", Computer Engineering&Systems, 2007. ICCES'07. International Conference on, IEEE,PI,Nov. 1, 2007 (Nov. 1, 2007), pp. 227-236, XP031212354.

* cited by examiner

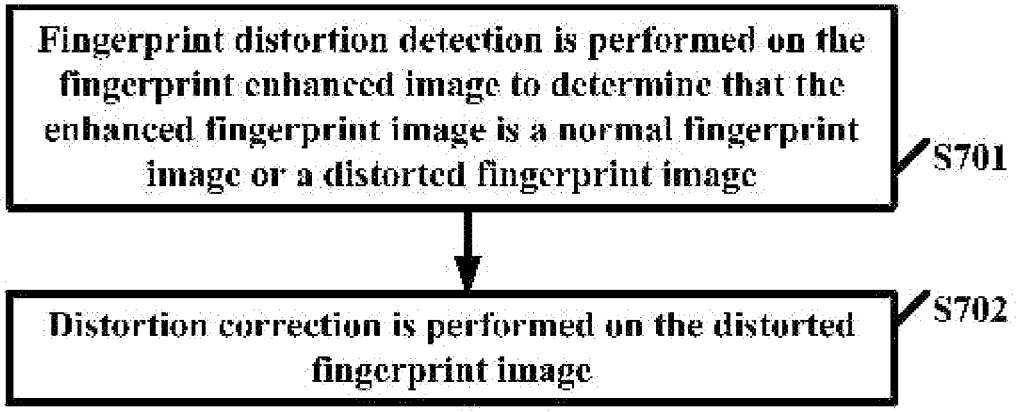
Fig. 7
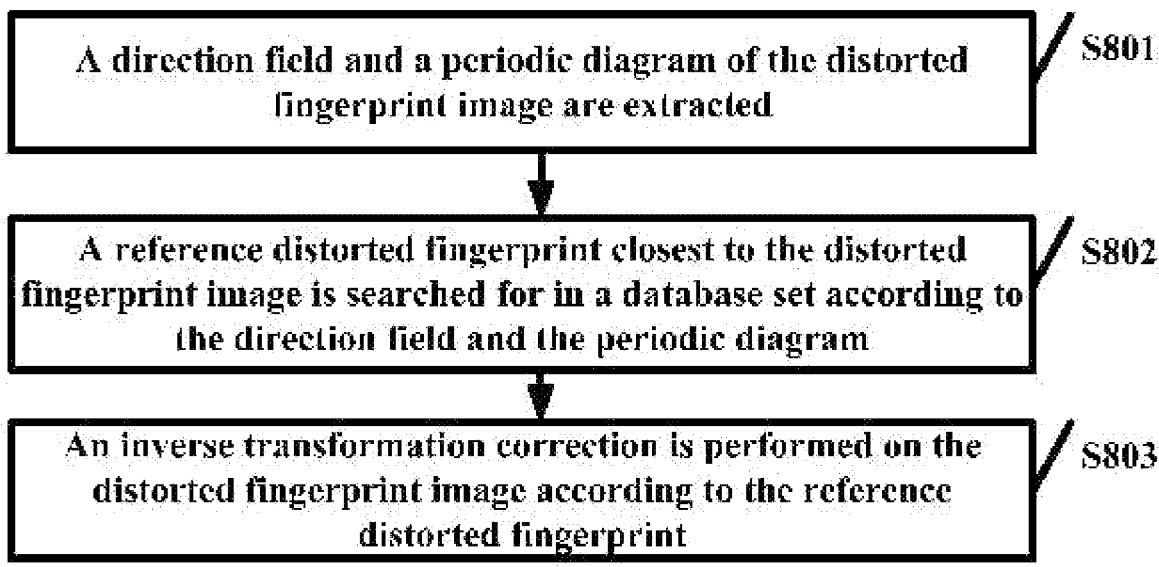
Fig. 8
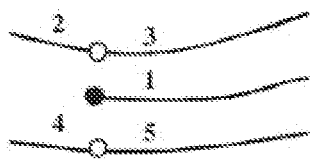
Fig. 9-a
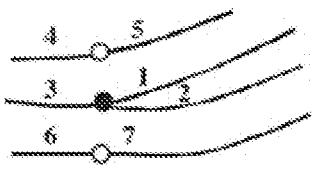
Fig. 9-b 11  12
24 or 23
35    31
43    46
52    57

Fig. 9-c

METHOD FOR ENHANCING FINGERPRINT IMAGE, IDENTIFYING FINGERPRINT AND STARTING-UP APPLICATION PROGRAM

CROSS-REFERENCE TO RELATED APPLICATIONS

The present disclosure claims priority of Chinese Patent Application No. 201910198302.7, filed to China Patent Office on Mar. 15, 2019, named "Method for enhancing fingerprint image, identifying fingerprint and starting-up application program". Contents of the present disclosure are hereby incorporated by reference in entirety of the Chinese Patent Application.

TECHNICAL FIELD

The embodiments of the present disclosure relate to image processing and terminal application technologies, and in particular to a method for enhancing a fingerprint image, a method for identifying a fingerprint and a method for starting-up an application program.

BACKGROUND

With the development of the mobile terminal (such as the mobile phone) from the function phone to the smart phone, the way of unlocking the mobile terminal is constantly changing, which turns from the earliest unlocking methods mainly based on the digital password or the pattern to the biometrics unlocking methods mainly based on fingerprints, faces, iris, etc. With the continuous breakthrough of the technology, the convenience and security of the unlocking method has been greatly improved.

Nowadays, the under-screen fingerprint unlocking solution has the advantages of good appearance, convenience, fast unlocking speed, and meeting the user's habits, and has become one of the mainstream method for unlocking the mobile phone. However, in most of the current under-screen fingerprint unlocking solutions, due to reasons such as unclear, incomplete or deformed fingerprint image, the user needs to repeatedly place their finger in the fingerprint collection area during registration to collect multiple local fingerprints. The solution is complicated, and the unlocking efficiency is low due to the low quality of the fingerprint image during unlocking, which seriously affects the user experience.

SUMMARY

At least some embodiments of the present disclosure provide a method for enhancing a fingerprint image, a method for identifying a fingerprint and a method for starting-up an application program, so as to at least reduce the number of the fingerprint collections, reduce the complexity of the fingerprint collection, improve the quality of the fingerprint image, improve the efficiency of fingerprint unlocking, and improve the user experience.

In at least one alternative embodiment of the present disclosure, a method for enhancing a fingerprint image is provided, which includes: eliminating a background texture of a fingerprint image of a current frame to obtain a pure fingerprint image; performing a first pre-processing on the pure fingerprint image to obtain a first pre-processed image; acquiring an effective area of the first pre-processed image; performing direction field estimation and direction field correction on the effective area; and performing a second pre-processing on the effective area after the direction field correction to obtain an enhanced fingerprint image.

In an optional embodiment, a pixel value of the background texture is an average pixel value of fingerprint images of N frames before the fingerprint image of the current frame, wherein N is a positive integer.

In an optional embodiment, eliminating the background texture of the fingerprint image of the current frame to obtain the pure fingerprint image comprises: performing in the fingerprint image of the current frame, pixel-by-pixel subtraction on the background texture to obtain the pure fingerprint image.

In an optional embodiment, before eliminating the background texture of the fingerprint image of the current frame, further comprising: performing local color transfer on the fingerprint image of the current frame and the background texture.

In an optional embodiment, the first pre-processing comprises enhancing contrast and/or denoising on the pure fingerprint image.

In an optional embodiment, acquiring the effective area of the first pre-processed image adopts a predetermined fingerprint foreground segmentation algorithm.

In an optional embodiment, the second pre-processing comprises: denoising the effective area; obtaining a binarized image; and refining a fingerprint ridge line in the binarized image to obtain the enhanced fingerprint image.

In another embodiment of the present disclosure, a method for identifying a fingerprint is provided, which includes: performing enhancement processing on a collected fingerprint image of a current frame to obtain an enhanced fingerprint image; wherein the enhancement processing comprises: eliminating a background texture of the fingerprint image of the current frame to obtain a pure fingerprint image; performing feature extraction on the enhanced fingerprint image to obtain feature data; and identifying the fingerprint according to comparison of the feature data with feature data of a fingerprint template.

In an optional embodiment, the enhancement processing further comprises: performing a first pre-processing on the pure fingerprint image to obtain a first pre-processed image; acquiring an effective area of the first pre-processed image; performing direction field estimation and direction field correction on the effective area; and performing a second pre-processing on the effective area after the direction field correction to obtain an enhanced fingerprint image.

In an optional embodiment, a pixel value of the background texture is an average pixel value of fingerprint images of N frames before the fingerprint image of the current frame, where N is a positive integer.

In an optional embodiment, eliminating the background texture of the fingerprint image of the current frame to obtain the pure fingerprint image comprises: performing in the fingerprint image of the current frame, pixel-by-pixel subtraction on the background texture to obtain the pure fingerprint image.

In an optional embodiment, before eliminating the background texture of the fingerprint image of the current frame, further comprising: performing local color transfer on the fingerprint image of the current frame and the background texture.

In an optional embodiment, before performing the feature extraction on the enhanced fingerprint image, further comprising: performing fingerprint distortion detection on the fingerprint enhanced image to determine that the enhanced fingerprint image is a normal fingerprint image or a distorted fingerprint image; and performing distortion correction on the distorted fingerprint image.

In an optional embodiment, performing the fingerprint distortion detection on the enhanced fingerprint image comprises: performing classification by inputting the enhanced fingerprint image to a classifier, wherein a classification result comprises the normal fingerprint image and the distorted fingerprint image.

In an optional embodiment, performing the distortion correction on the distorted fingerprint image comprises: extracting a direction field and a periodic diagram of the distorted fingerprint image; searching for in a database set, a reference distorted fingerprint closest to the distorted fingerprint image according to the direction field and the periodic diagram; and performing inverse transformation correction on the distorted fingerprint image according to the reference distorted fingerprint.

In an optional embodiment, the feature data comprises a detail point feature and/or a ridge feature of a fingerprint ridge.

In an optional embodiment, identifying the fingerprint according to comparison of the feature data with feature data of the fingerprint template comprises: calculating a feature similarity between the feature data and the feature data of the fingerprint template; and when the feature similarity is greater than or equal to a threshold, completing the fingerprint identification.

In another embodiment of the present disclosure, a method for starting up an application program based on fingerprint identification is provided, which includes: collecting a fingerprint image; performing fingerprint identification on the fingerprint image by adopting any one of the above described the method for identifying the fingerprint; starting-up the application program when the fingerprint is correctly identified.

In an optional embodiment, before collecting the fingerprint image, further comprising: detecting whether a touch operation of a finger on a touch screen satisfies a preset condition for starting up collecting the fingerprint image.

In an optional embodiment, further comprising: completing identity verification while starting up the application program.

In another embodiment of the present disclosure, a fingerprint sensing system is provided, which includes: a display screen, comprising a light-emitting display element, configured to display a picture; a fingerprint collecting component, arranged at least in a local area below the display screen and configured to collect a fingerprint image; and a fingerprint identifying component, configured to receive the fingerprint image and adopt any one of the above described method for identifying the fingerprint, to perform fingerprint identification on the fingerprint image.

In an optional embodiment, the fingerprint collecting component comprises: a lens; an imaging element, arranged below the lens and configured to directly acquire the fingerprint image on the display screen.

In an optional embodiment, the fingerprint collecting component is configured to obtain the fingerprint image by detecting light emitted from the display screen and light reflected on a surface of the finger back to the display screen.

In an optional embodiment, the fingerprint collecting component obtains the fingerprint image by detecting a light penetrating through the display screen from a finger; and when the light with a refraction angle greater than a first threshold is detected, a fingerprint ridge line is determined, and when the light with a refraction angle less than or equal to the first threshold is detected, a fingerprint valley line is determined, and the fingerprint image is obtained according to the fingerprint ridge line and the fingerprint valley line.

In an optional embodiment, the first threshold value may be a refraction angle at the fingerprint valley line.

In an optional embodiment, the fingerprint collecting component further comprises a light path guiding component, wherein the light path guiding component is configured to guide light with a refraction angle greater than the first threshold.

In an optional embodiment, the fingerprint collecting component further comprises a photoelectric sensor, wherein the photoelectric sensor is configured to determine that the light is the fingerprint ridge line when the light with the refraction angle greater than the first threshold is detected, and determine that the light is the fingerprint valley line when the light with the refraction angle less than or equal to the first threshold is deter dined, thereby obtaining the fingerprint pattern.

In another embodiment of the present disclosure, an electronic device is provided, which includes: a processor; and a memory, configured to store executable instructions of the processor; wherein the processor is configured to execute any one of the above described methods for identifying the fingerprint by executing the executable instructions.

In an optional embodiment, the electronic device further includes any one of the above described fingerprint sensing system.

In another embodiment of the present disclosure, a storage medium is provides, which includes a stored program, when the program runs, a device where the storage medium is located is controlled to execute any one of the above described method for identifying the fingerprint.

Through the above embodiment of the present disclosure, the number and complexity of fingerprint collections are reduced, the quality of fingerprint images is improved, the efficiency of fingerprint unlocking is improved, and the user experience is improved. Therefore, at least the following beneficial effects are included:

1. Only few times of fingerprint collections are taken to complete identity registration, which is convenient and fast.
2. Fingerprint identification can be performed at any position on the mobile phone screen, which is flexible and free.
3. Fingerprint identification, application starting up, and identity verification can be implemented in one step in application design.
4. Identification effect for distorted and deformed fingerprints are good, stable and reliable.

Other features and advantages of the embodiments of the present disclosure will be explained in the subsequent description, and partly become obvious from the description, or be understood by implementing the present disclosure. The objects and other advantages of the present disclosure can be realized and obtained by the structures particularly pointed out in the description, claims and drawings.

BRIEF DESCRIPTION OF THE DRAWINGS

The accompanying drawings are used to provide further understanding of the present disclosure, and are part of the description. The exemplary embodiments and description are used to explain the present disclosure rather than limit the present disclosure. In the accompanying drawings:

FIG. 7 is a flowchart diagram of a method before performing feature extraction on the enhanced fingerprint image according to an embodiment of the present disclosure.

FIG. 8 is a flowchart diagram of a method for performing distortion correction on a distorted fingerprint image according to an embodiment of the present disclosure;

FIG. 9a is a first diagram showing a ridge line, a detail point and a sub-ridge line according to an embodiment of the present disclosure.

FIG. 9b is a second diagram showing the ridge line, the detail point and the sub-ridge line according to an embodiment of the present disclosure.

FIG. 9c is a schematic diagram showing a labeling relationship between sub-ridge lines according to an embodiment of the present disclosure.

DETAILED DESCRIPTION

In order to make the objectives, technical solutions, and advantages of the embodiments of the present disclosure more clear, the embodiments of the present disclosure will be described in detail below with reference to the accompanying drawings. It should be noted that, in the case of no conflict, the embodiments in the present disclosure and the features in the embodiments can be arbitrarily combined with each other.

The steps shown in the flowchart of the figures may be performed in a computer system comprising a set of computer-executable instructions. And, although the logical order is shown in the flowchart, in some cases, the steps may be performed in a different order than those being shown or described herein.

Figure 1:
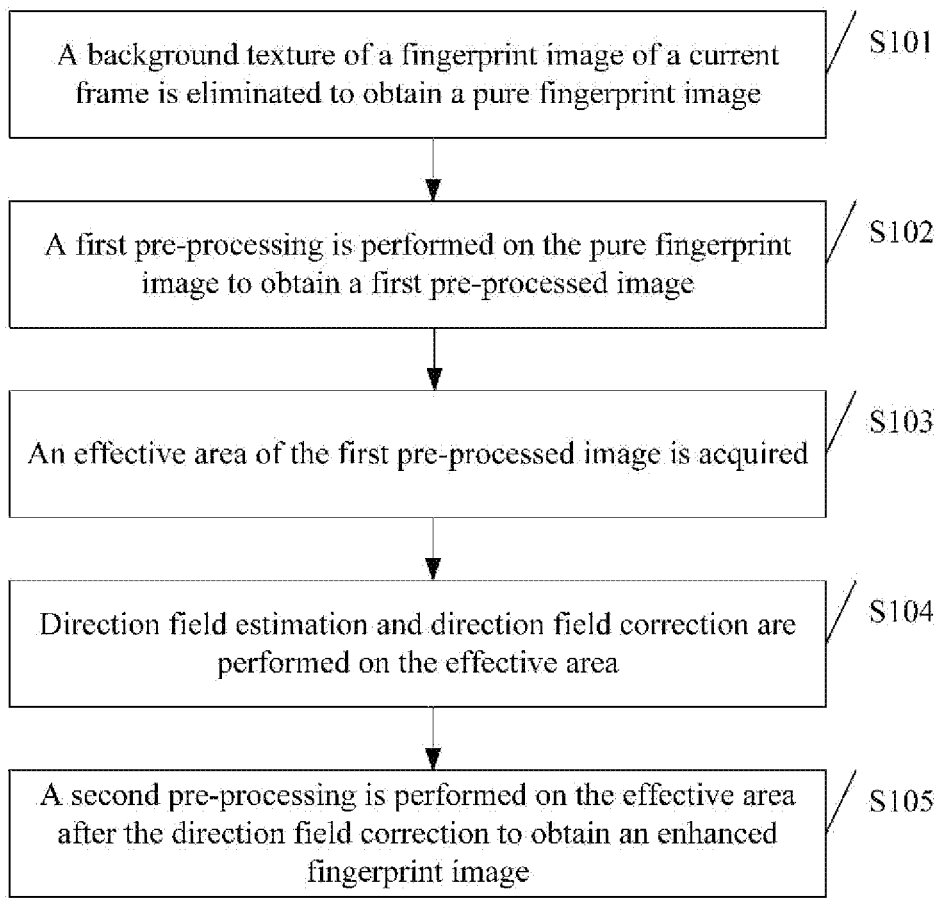
FIG. 1 is a flowchart of a method for enhancing a fingerprint image according to an embodiment of the present disclosure.

In an embodiment of the present disclosure, a method for enhancing a fingerprint image is provided. As shown in FIG. 1, the method includes steps S101 to S105.

At step S101, a background texture of a fingerprint image of a current frame is eliminated to obtain a pure fingerprint image.

In an exemplary embodiment of the present disclosure, during the under-screen fingerprint unlocking process, because the optical fingerprint image collected under the screen is weak, it is usually necessary to collect the fingerprint images for several times for identification during the unlocking process, thereby increasing the complexity of the user operation and decreasing the user experience. To solve this problem, the solution of the present disclosure may first perform enhancement processing on the collected fingerprint image.

In an exemplary embodiment of the present disclosure, the enhancement processing may include: eliminating the background texture on the fingerprint image of the current frame to obtain the pure fingerprint image.

In an exemplary embodiment of the present disclosure, since the collected image usually contain not only fingerprint, but also the background texture of the fingerprint image (for example, the texture of the screen itself, residual fingerprint images, etc.), the fingerprint may be separated from the background texture in advance during the enhancement process.

In an exemplary embodiment of the present disclosure, the step of eliminating the background texture on the fingerprint image of the current frame to obtain the pure fingerprint image may include:

performing pixel-by-pixel subtraction on the background texture on the fingerprint image of the current frame to obtain the pure fingerprint image.

In an exemplary embodiment of the present disclosure, the pixel value of the background texture may be represent by an average pixel value of fingerprint images of N frames before the fingerprint image of the current frame, wherein N is a positive integer.

In an exemplary embodiment of the present disclosure, the pixel value of the background texture may be obtained by calculating the average pixel value in multiple frames of images, that is, using the fingerprint images of N frames before the fingerprint image of the current frame to calculate the average pixel value, and the obtained result may be approximately considered as the pixel value of the background texture. This is because in the collected fingerprint image sequence, the background texture is relatively fixed and strong, while the fingerprint changes a lot and is weak. The occasional appeared fingerprint can be further weakened by averaging multiple frames of images, and a relatively stable background texture is retained. After the pixel value of the background texture is obtained, the pixels in the fingerprint image of the current frame and the pixels in the background texture may be correspondingly subtracted, to obtain a pure fingerprint image by eliminating the background texture.

In an exemplary embodiment of the present disclosure, performing in the fingerprint image of the current frame, pixel-by-pixel subtraction on the background texture to obtain the pure fingerprint image can include:

subtracting the average pixel value of the fingerprint images of N frames before the fingerprint image of the current frame from the pixel value in the fingerprint image of the current frame, and eliminating the background texture in the fingerprint image of the current frame by performing an algorithm (such as multiplying by a preset coefficient and adding a preset value) on the obtained subtraction result.

In an exemplary embodiment of the present disclosure, the method for enhancing the fingerprint image may also include: before the background texture of the fingerprint image of the current frame is eliminated, performing local color transfer on the fingerprint image of the current frame and the background texture, so that the brightness of the fingerprint image of the current frame and the background texture can be consistent.

In an exemplary embodiment of the present disclosure, a problem that may occur during the step of eliminating background texture on the fingerprint image of the current frame is that the brightness of the fingerprint image of the current frame and the background texture may be inconsistent, and direct subtraction will produce an incorrect result. Therefore, local color transfer may be firstly performed on the fingerprint image of the current frame and the background texture to make the brightness of the background texture and the fingerprint image be consistent, and then perform corresponding pixel-by-pixel subtraction on the background texture in the fingerprint image of the current frame to obtain the relatively pure fingerprint image, that is, the pure fingerprint image described above.

At step S102, a first pre-processing is performed on the pure fingerprint image to obtain a first pre-processed image.

In an exemplary embodiment of the present disclosure, the first pre-processing may include enhancing contrast and/or denoising on the pure fingerprint image.

In an exemplary embodiment of the present disclosure, the step of enhancing contrast and denoising on the pure fingerprint image can include:
  performing local contrast normalization (LCN) or local adaptive histogram equalization process on the pure fingerprint image to enhance the contrast of the pure fingerprint image; and
  performing first filter on the pure fingerprint image with enhanced contrast by using a preset denoising algorithm.

In an exemplary embodiment of the present disclosure, because the fingerprint image is weak, the fingerprint image obtained after the background texture is subtracted usually has a low contrast, and sometimes the overall contrast is uneven. Therefore, local contrast normalization or local adaptive histogram equalization process may be applied to the pure fingerprint image after the background texture is eliminated to enhance the contrast of the image and make the overall contrast of the image relatively even. In this process, the original noise of the image will be amplified to a certain extent, so a preset denoising algorithm may be used to perform an additional denoising processing as to suppress the noise of the fingerprint image with enhanced contrast. Thus, a relatively clear first pre-processed image is obtained.

In an exemplary embodiment of the present disclosure, the preset denoising algorithm may include a fast non-local means denoising algorithm.

In an exemplary embodiment of the present disclosure, unlike many classic denoising algorithms which will blur the image, the fast non-local mean denoising algorithm can better retain the edge information in the image while denoising. In addition, in other embodiments of the present disclosure, a bilateral filter or an anisotropic filter may be used instead of the fast non-local mean denoising algorithm.

It should be noted that those skilled in the art may use both steps of contrast enhancement and denoising, or may use only contrast enhancement or denoising according to the requirements of the actual application.

At step S103, an effective area of the first pre-processed image is acquired.

In an exemplary embodiment of the present disclosure, although the quality of the obtained fingerprint image is relatively good after the first pre-processing, further processing can be performed.

In an exemplary embodiment of the present disclosure, the effective area in the pure fingerprint image after the first filtering may be obtained; the effective area is obtained by calculating the pure fingerprint image according to a preset fingerprint foreground segmentation algorithm.

In an exemplary embodiment of the present disclosure, the effective area in the pure fingerprint image usually refers to the middle part of the fingerprint image, the surrounding area of the fingerprint area usually is the ineffective background part. Processing the ineffective part will not only increase the time cost but may also cause additional interference. Therefore, the fingerprint image may be segmented to extract the effective fingerprint foreground and eliminate the ineffective background part.

In an exemplary embodiment of the present disclosure, the step of acquiring the effective area of the first pre-processed image may adopt a preset fingerprint foreground segmentation algorithm.

In an exemplary embodiment of the present disclosure, the preset fingerprint foreground segmentation algorithm may include: an improved fingerprint image segmentation algorithm based on boundary values, or a segmentation method based on the gray average or gray variance of image blocks. The preset fingerprint foreground segmentation algorithm can improve the performance of subsequent processing while eliminating unnecessary interference. After the fingerprint foreground area (that is, the above-mentioned effective area) is obtained, the fingerprint foreground area is subjected to normalization processing, which can remove the difference in image intensity caused by different pressures during fingerprint collection.

At step S104, direction field estimation and direction field correction are performed on the effective area.

In an exemplary embodiment of the present disclosure, direction field estimation may be performed on the effective area in the pure fingerprint image. The direction field is an inherent property of a fingerprint image. The direction field defines the invariant coordinates of the ridge and valley lines of a fingerprint in a local neighborhood.

In an exemplary embodiment of the present disclosure, the direction field estimation may use a Fourier transform, a gradient method, or the like to estimate an initial direction field of the fingerprint image. The direction field correction may include: using a direction field dictionary to correct errors in the initial direction field of the effective area to obtain a more accurate direction field result.

Figure 2:
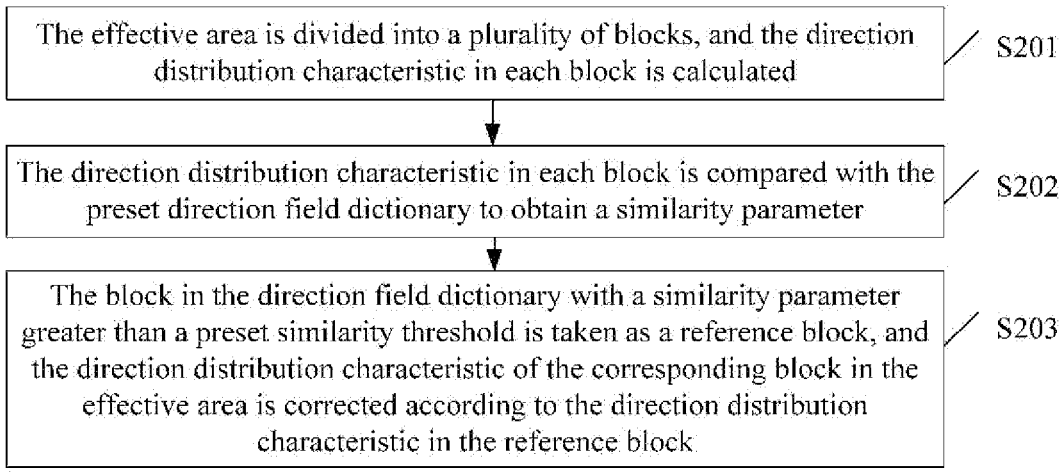
FIG. 2 is a flowchart of a method for correcting an erroneous part in an initial direction field of an effective area by using a direction field dictionary according to an embodiment of the present disclosure.

In an exemplary embodiment of the present disclosure, as shown in FIG. 2, the step of using the direction field dictionary to correct errors in the initial direction field of the effective area to obtain the more accurate direction field result may include steps S201 to S203.

At step S201, the effective area is divided into a plurality of blocks, and the direction distribution characteristic in each block is calculated.

At step S202, the direction distribution characteristic in each block is compared with the preset direction field dictionary to obtain a similarity parameter.

At step S203, the block in the direction field dictionary with a similarity parameter greater than a preset similarity threshold is taken as a reference block, and the direction distribution characteristic of the corresponding block in the effective area is corrected according to the direction distribution characteristic in the reference block.

In an exemplary embodiment of the present disclosure, the preset direction field dictionary is obtained by training the sample fingerprint images that meet the preset quality requirements, and extracting the direction distribution characteristics of all the blocks in the sample fingerprint image and performing clustering.

In an exemplary embodiment of the present disclosure, the fingerprint image may be divided into multiple blocks, and the direction distribution characteristic of each block is calculated, so that each block is called a word in the direction field dictionary. A complete direction field dictionary may be obtained by using fingerprint images with good quality for training, and extracting the direction distribution characteristics in all blocks and performing clustering. The direction distribution of each block in the dictionary is relatively continuous and smooth. For the initial direction field of the current fingerprint image, blocks are divided in the same way and compared with the direction field dictionary obtained by training. The direction distribution of the most similar block in the direction field dictionary is used to correct the direction distribution of the current block to make the direction field in the current fingerprint image more accurate.

At step S105, a second pre-processing is performed on the effective area after the direction field correction to obtain an enhanced fingerprint image.

Figure 3:
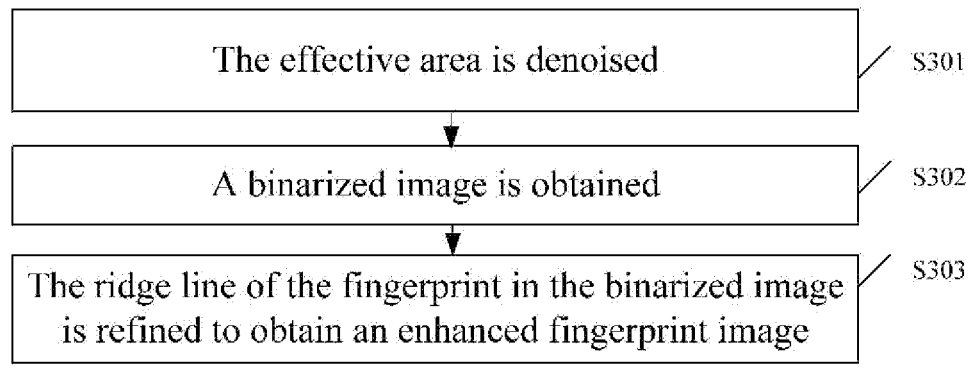
FIG. 3 is a flowchart of a second pre-processing method according to an embodiment of the present disclosure.

In an exemplary embodiment of the present disclosure, as shown in FIG. 3, the second pre-processing may include steps S301 to S303.

At step S301, the effective area is denoised.

In an exemplary embodiment of the present disclosure, the Gabor filter may be used to perform the second filtering on the effective area after the direction field correction, to remove noise in the image and retain sinusoidal ridge and valley lines.

At step S302, a binarized image is obtained.

In an exemplary embodiment of the present disclosure, an adaptive image binarization algorithm may be adopted to calculate an optimal threshold value for different regions in the effective area after the second filtering, to obtain a binarized image of complete fingerprint information in the effective area.

At step S303, the ridge line of the fingerprint in the binarized image is refined to obtain an enhanced fingerprint image.

In an exemplary embodiment of the present disclosure, the ridge line in the binarized image may be refined to a width of one pixel, and the original topology of the fingerprint is retained without adding additional noise.

In an exemplary embodiment of the present disclosure, after obtaining more accurate direction field information, a Gabor filter may be used to filter the fingerprint foreground, which can remove some noise in the image and retain sinusoidal ridge and valley lines. Then the binarization operation is performed on the filtered fingerprint image. During this period, it is very important to choose an appropriate threshold. An adaptive image binarization algorithm may be used to calculate the optimal threshold for different regions to obtain a binarized image of complete fingerprint information. The final step of fingerprint image pre-processing may be refining, which can refine the ridge line in the binarized image to the width of one pixel, while retaining the original topology of the fingerprint without adding additional noise, so as to facilitate subsequent feature extraction.

Figure 4:
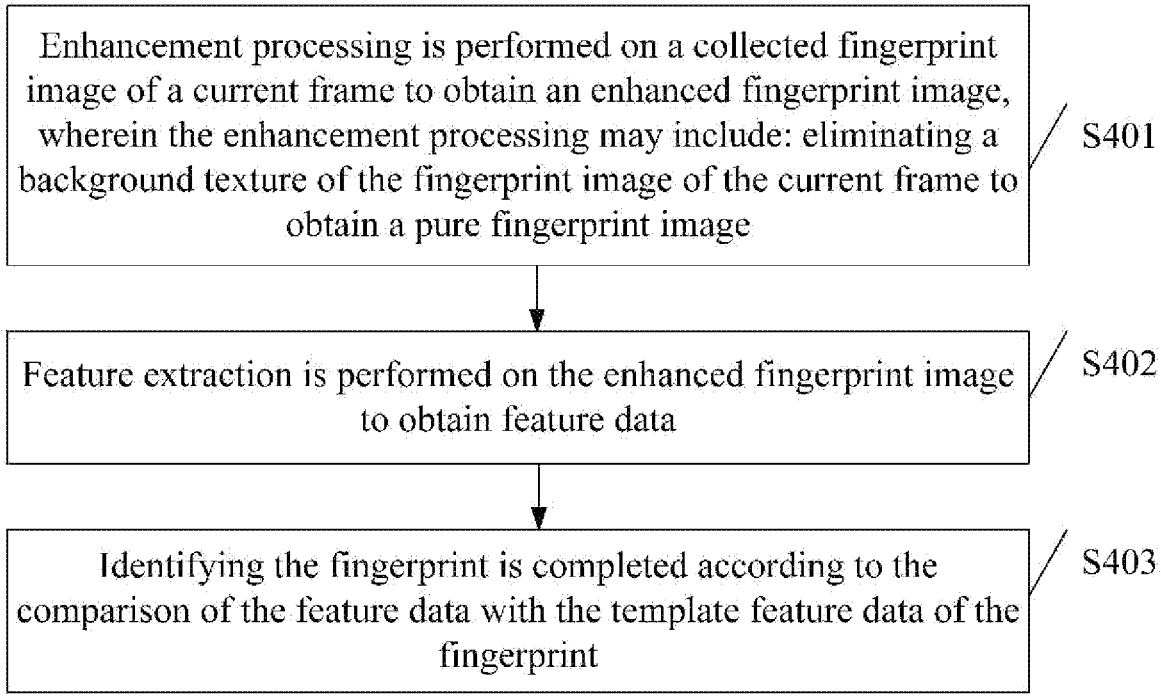
FIG. 4 is a flowchart of a method for identifying fingerprint according to an embodiment of the present disclosure.

In order to achieve the purpose of the embodiment of the present disclosure, an embodiment of the present disclosure provides a method for identifying a fingerprint. As shown in FIG. 4, the method may include steps S401 to S403.

At step S401, enhancement processing is performed on a collected fingerprint image of a current frame to obtain an enhanced fingerprint image. The enhancement processing may include: eliminating a background texture of the fingerprint image of the current frame to obtain a pure fingerprint image.

In an exemplary embodiment of the present disclosure, during the under-screen fingerprint unlocking process, because the optical fingerprint image collected under the screen is weak, it is usually required to collect the fingerprint image for several times for identification during the unlocking process, thereby increasing the complexity of the user operation and reducing the user experience. To solve this problem, the solution of the embodiment of the present disclosure may first perform enhancement processing on the collected fingerprint image.

In an exemplary embodiment of the present disclosure, the enhancement processing may include: performing background texture elimination on the fingerprint image of the current frame to obtain the pure fingerprint image.

In an exemplary embodiment of the present disclosure, because the collected images usually contain not only fingerprints, but also the background texture of the fingerprint images (for example, the texture of the screen itself, residual fingerprint images, etc.), the fingerprint may be separated from the background texture in the enhancement process.

In an exemplary embodiment of the present disclosure, the step of eliminating the background texture on the fingerprint image of the current frame to obtain the pure fingerprint image may include:

using the fingerprint images of N frames before the fingerprint image of the current frame to calculate the pixel average value and using the calculation result as the pixel value of the background texture; N is a positive integer; and performing pixel-by-pixel subtraction in the fingerprint image of the current frame according to the background texture to obtain the pure fingerprint image.

In an exemplary embodiment of the present disclosure, the pixel value of the background texture may be obtained by calculating the pixel average value of multiple frames of the images, that is, using the fingerprint images of N frames before the fingerprint image of the current frame to calculate the average pixel value, and the obtained result may be approximately taken as the pixel value of the background texture. This is because in the collected fingerprint images, the background texture is relatively fixed and strong, while the fingerprint changes a lot and weak. The occasional fingerprint can be further weakened by averaging multiple frames of images, and a relatively stable background texture is retained. After the background texture is obtained, the corresponding pixels of the fingerprint image of the current frame and the background texture may be subtracted to obtain the pure fingerprint image after eliminating the background texture.

In an exemplary embodiment of the present disclosure, the step of performing in the fingerprint image of the current frame, pixel-by-pixel subtraction on the background texture may include: subtracting the pixel average value of the fingerprint image of the N frames before the fingerprint image of the current frame from the pixels of the fingerprint image of the current frame, and an algorithm (such as multiplying by a preset coefficient and adding it to a preset value) is applied to the obtained subtraction result to realize background texture elimination in the fingerprint image of the current frame.

In an exemplary embodiment of the present disclosure, before performing pixel-by-pixel subtraction in the fingerprint image of the current frame according to the background texture, the method may also include:

performing local color transfer on the fingerprint image of the current frame and the background texture, so that the brightness of the fingerprint image of the current frame and the background texture are consistent.

In an exemplary embodiment of the present disclosure, a problem that may occur in the step of eliminating the background texture on the fingerprint image of the current frame is that the brightness of the fingerprint image of the current frame and the background texture are inconsistent, and direct subtraction will produce an incorrect result. Therefore, local color transfer is firstly performed on the fingerprint image and the background texture, to make the brightness of the background texture and the fingerprint image be consistent, and then the corresponding pixel-by-pixel subtraction is performed to obtain a relatively pure fingerprint image, that is, the pure fingerprint image described above.

Figure 5:
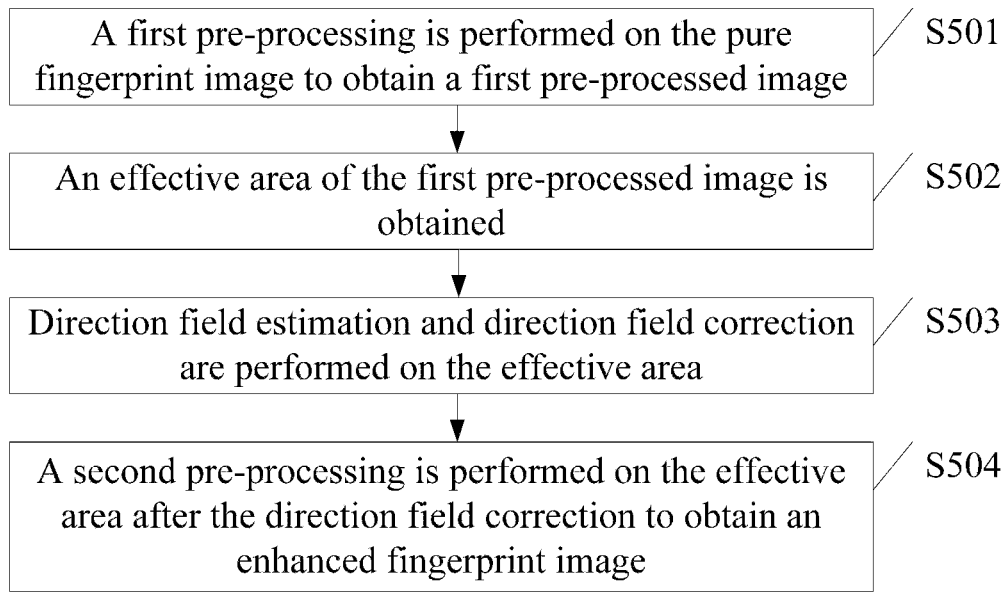
FIG. 5 is a flowchart of a method for enhancing a pure fingerprint image obtained by eliminating the background texture of the fingerprint image in the current frame according to an embodiment of the present disclosure.

In an exemplary embodiment of the present disclosure, as shown in FIG. 5, after the step of performing pixel-by-pixel subtraction in the fingerprint image of the current frame to obtain the pure fingerprint image, the enhancement processing may also include steps S501 to S504.

At step S501, a first pre-processing is performed on the pure fingerprint image to obtain a first pre-processed image.

In an exemplary embodiment of the present disclosure, the first pre-processing may include:

performing local contrast normalization (LCN) or local adaptive histogram equalization processing on the pure fingerprint image to enhance the contrast of the pure fingerprint image; and performing a first filtering on the pure fingerprint image with enhanced contrast by using a preset denoising algorithm.

In an exemplary embodiment of the present disclosure, because the fingerprint image is weak, the fingerprint image obtained after the background texture is eliminated usually has a low contrast, and sometimes the overall contrast is uneven. Therefore, local contrast normalization or local adaptive histogram equalization process may be applied to the pure fingerprint image after the background texture is eliminated to enhance the contrast of the image and make the overall contrast of the image relatively even. In this process, the original noise of the image will be amplified to a certain extent, so a preset denoising algorithm may be used to perform an additional denoising processing to suppress the noise of the fingerprint image with enhanced contrast. At this point, a relatively clear first pre-processed image is obtained.

In an exemplary embodiment of the present disclosure, the preset denoising processing may include a fast non-local means denoising algorithm.

In an exemplary embodiment of the present disclosure, unlike many classic denoising algorithms which will blur the image, the fast non-local mean denoising algorithm can better retain the edge information in the image while denoising. In addition, in other embodiments of the present disclosure, a bilateral filter or an anisotropic filter may be used instead of the fast non-local mean denoising algorithm.

At step S502, an effective area of the first pre-processed image is obtained.

In an exemplary embodiment of the present disclosure, although the quality of the obtained fingerprint image is relatively good after the previous first pre-processing, further processing may be made, for example, obtaining the effective area in the pure fingerprint image after the first filtering; the effective area is obtained by calculating the pure fingerprint image according to a preset fingerprint foreground segmentation algorithm.

In an exemplary embodiment of the present disclosure, the effective area in the pure fingerprint image usually refers to the middle part of the fingerprint image, the surrounding area of the fingerprint area is usually the ineffective background part. Processing the ineffective part will not only increase the time cost but also cause additional interference. Therefore, the fingerprint image may be segmented to extract the effective fingerprint foreground and eliminate the ineffective background part.

In an exemplary embodiment of the present disclosure, the preset fingerprint foreground segmentation algorithm may include: an improved fingerprint image segmentation algorithm based on boundary values, or a segmentation method based on the gray average or gray variance of image blocks. The preset fingerprint foreground segmentation algorithm can improve the performance of subsequent processing while eliminating unnecessary interference. After the fingerprint foreground area (that is, the above-mentioned effective area) is obtained, the fingerprint foreground area is subjected to normalization processing, which can remove the difference in image intensity caused by different pressures during fingerprint collection.

At step S503, direction field estimation and direction field correction are performed on the effective area.

In an exemplary embodiment of the present disclosure, direction field estimation may be performed on the effective area in the pure fingerprint image. The direction field is an inherent property of a fingerprint image. The direction field defines the invariant coordinates of the ridge and valley lines of a fingerprint in a local neighborhood.

In an exemplary embodiment of the present disclosure, the direction field estimation may use a Fourier transform, a gradient method, or the like to estimate an initial direction field of the fingerprint image. The direction field correction may include: using a direction field dictionary to correct errors in the initial direction field of the effective area to obtain a more accurate direction field result.

In an exemplary embodiment of the present disclosure, the step of using a direction field dictionary to correct errors in the initial direction field of the effective area to obtain the more accurate direction field result may include:

dividing the effective area into a plurality of blocks, and calculating the direction distribution characteristic of each block.

comparing the direction distribution characteristic in each block with the preset direction field dictionary to obtain a similarity parameter.

taking the block in the direction field dictionary with a similarity parameter greater than a preset similarity threshold as the reference block, and correcting the direction distribution characteristic of the corresponding block in the effective area according to the direction distribution characteristic of the reference block.

In an exemplary embodiment of the present disclosure, the preset direction field dictionary is obtained by training the sample fingerprint images that meet the preset quality requirements, and extracting the direction distribution characteristics of all the blocks in the sample fingerprint image and performing clustering.

In an exemplary embodiment of the present disclosure, the fingerprint image may be divided into multiple blocks, and the direction distribution characteristic of each block is calculated, so that each block is called a word in the direction field dictionary. A complete direction field dictionary may be obtained by using fingerprint images with good quality for training, and extracting the direction distribution characteristics in all blocks and performing clustering. The direction distribution of each block in the dictionary is relatively continuous and smooth. For the initial direction field of the current fingerprint image, blocks are divided in the same way and compared with the direction field dictionary obtained by training. The direction distribution of the most similar block in the direction field dictionary is used to correct the direction distribution of the current block to make the direction field in the current fingerprint image more accurate.

At step S504, a second pre-processing is performed on the effective area after the direction field correction to obtain an enhanced fingerprint image.

In an exemplary embodiment of the present disclosure, the second pre-processing may include: second filtering, second binarization processing and refining.

Figure 6:
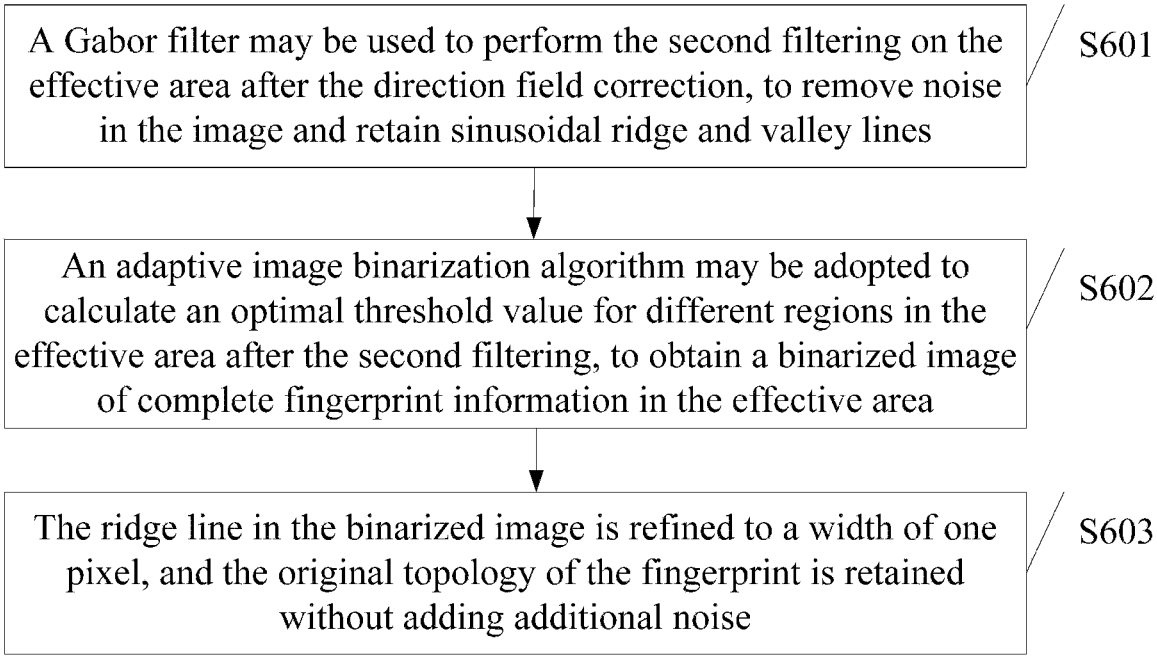
FIG. 6 is a flowchart diagram of a method for performing a second pre-processing on the effective area after direction field correction according to an embodiment of the present disclosure.

In an exemplary embodiment of the present disclosure, as shown in FIG. 6, the step of performing second pre-processing on the effective area after direction field correction may include steps S601 to S603.

At step S601, a Gabor filter may be used to perform the second filtering on the effective area after the direction field correction, to remove noise in the image and retain sinusoidal ridge and valley lines.

At step S602, an adaptive image binarization algorithm may be adopted to calculate an optimal threshold value for different regions in the effective area after the second filtering, to obtain a binarized image of complete fingerprint information in the effective area.

At step S603, the ridge line in the binarized image is refined to a width of one pixel, and the original topology of the fingerprint is retained without adding additional noise.

In an exemplary embodiment of the present disclosure, after obtaining more accurate direction field information, a Gabor filter may be used to filter the fingerprint foreground, which can remove some noise in the image and retain sinusoidal ridge and valley lines. Then the binarization operation is performed on the filtered fingerprint image. During this period, it is very important to choose an appropriate threshold. An adaptive image binarization algorithm may be used to calculate the optimal threshold for different regions to obtain a binarized image of complete fingerprint information. The final step of fingerprint image pre-processing may be refining, which can refine the ridge line in the binarized image to the width of one pixel, while retaining the original topology of the fingerprint without adding additional noise, so as to facilitate subsequent feature extraction.

In an exemplary embodiment of the present disclosure, as shown in FIG. 7, before the step of extracting features of the enhanced fingerprint image, the method may also include steps S701 to S702.

At step S701, fingerprint distortion detection is performed on the fingerprint enhanced image to determine that the enhanced fingerprint image is a normal fingerprint image or a distorted fingerprint image.

At step S702, distortion correction is performed on the distorted fingerprint image.

In an exemplary embodiment of the present disclosure, during fingerprint identification, fingerprint distortion is often caused by different pressures and directions of finger pressing during the collection process, which will result in different feature data of the same finger to affect the final identification result. Therefore, a fingerprint distortion detection and correction algorithm may be used to correct the distorted fingerprint image to a non-distortion state, thereby ensuring the consistency of the finally obtained feature data.

In an exemplary embodiment of the present disclosure, the step of performing fingerprint distortion detection on the enhanced fingerprint image may include:

performing classification by inputting the enhanced fingerprint image to a classifier, and a classification result comprises the normal fingerprint image and the distorted fingerprint image.

In an exemplary embodiment of the present disclosure, the distortion of the fingerprint will cause the final extracted feature data to be different from the normal state, which will greatly reduce the matching scores and cause the incorrect identification result. Therefore, distortion detection may be firstly performed on the fingerprint image, and if distortion is detected, the fingerprint image is corrected to restore the fingerprint image to a normal state. Thus, a classifier may be trained by using a large number of normal fingerprint images and distorted fingerprint images collected in advance, and the enhanced fingerprint images are input into the trained classifier, and the currently input fingerprint image is classified into one of two categories. If the classification result belongs to distortion, distortion correction is performed on the fingerprint image.

In an exemplary embodiment of the present disclosure, as shown in FIG. 8, the step of performing distortion correction on the distorted fingerprint image may include steps S801 to S803.

At step S801, a direction field and a periodic diagram of the distorted fingerprint image are extracted.

At step S802, a reference distorted fingerprint closest to the distorted fingerprint image is searched for in a database set according to the direction field and the periodic diagram.

At step S803, an inverse transformation correction is performed on the distorted fingerprint image according to the reference distorted fingerprint.

In an exemplary embodiment of the present disclosure, distortion correction may be done by estimating the distortion field of a distorted fingerprint image and making an inverse transform to the distortion field. Thus, a database set is constructed, which contains the distortion field corresponding to various distorted fingerprints (distortion field refers to the transformation relationship of a fingerprint between a normal non-distorted state and a distorted state), a direction field, and a periodic diagram (periodic diagram refers to the period or frequency of ridge lines (representing the density of the ridge lines) at different locations of the fingerprint image). The specific method may include: collecting image pairs of the common normal fingerprint image and the distorted fingerprint image to obtain the statistical models of common distortion fields through these image pairs, and using these statistical models to synthesize a large number of distortion fields and apply them to normal fingerprint images, so as to obtain a set of distorted fingerprint images corresponding to the normal fingerprint images and their direction fields and periodic diagrams, and further use the set as the above-mentioned database set.

In an exemplary embodiment of the present disclosure, the step of performing the distortion correction on the fingerprint image may include: for the currently detected distorted fingerprint image, extracting its direction field and periodic diagram firstly, searching for the reference distorted fingerprint with features closest to the features of the current distorted fingerprint image in the database set, performing inverse transformation correction on the current distorted fingerprint image according to the distortion field corresponding to the distorted fingerprint, to restore the current distorted fingerprint image to a normal state.

At step S402, feature extraction is performed on the enhanced fingerprint image to obtain feature data.

In an exemplary embodiment of the present disclosure, the feature data may include but is not limited to detail point features, ridge features of fingerprint ridges.

In an exemplary embodiment of the present disclosure, after the above steps, the fingerprint image enhancement processing may be completed, and the distortion fingerprint may be corrected to obtain a high-quality fingerprint image. For this high-quality fingerprint image, features may be extracted from the refined fingerprint ridge lines to obtain feature data.

In an exemplary embodiment of the present disclosure, detail point features may be extracted, and the detail point features may include end points, branch points of ridge lines, and the like. The feature data of the fingerprint image of the current fingerprint image may be obtained by encoding and storing the detail point features in a preset form.

At step S403, identifying the fingerprint is completed according to the comparison of the feature data with the template feature data of the fingerprint.

In an exemplary embodiment of the present disclosure, the step of completing identifying the fingerprint according to the comparison of the feature data with the template feature data of the fingerprint may include:

calculating a feature similarity between the feature data and the feature data of the fingerprint template; and completing the fingerprint identification when the feature similarity is greater than or equal to a threshold.

In an exemplary embodiment of the present disclosure, by comparing the obtained feature data of the fingerprint image of the current frame with the feature data of different fingerprints from the fingerprint template, the similarity between different fingerprints may be calculated, and fingerprint identification and verification can be completed according to the similarity. Generally, when the similarity between the feature data of the fingerprint image of the current frame and the preset feature data of any one of different fingerprints is greater than or equal to a preset similarity threshold, it is determined that the feature data of the fingerprint image of the current frame matches with the feature data of the fingerprint template, and the verification is succeed.

In an exemplary embodiment of the present disclosure, generally, in the final stage of fingerprint identification, when fingerprint comparison is performed, the posture of the internally stored fingerprint template (that is, the preset feature data of different fingerprints) may be different from the posture of the current input fingerprint and cannot be directly matched. Thus, the fingerprint images to be compared with each other are firstly aligned. Fingerprint alignment is usually achieved by finding the most similar substructures (such as detail point sets or ridge lines). A substructure herein may be a detail point and multiple related ridge lines, for example, the substructure may include: a detail point, a ridge line where the detail point is located and the adjacent ridge lines on both sides of the ridge line. For the substructure, the detail point (represented by the end point or bifurcation point inside the ridge lines, as shown by the black dots in FIGS. 9-a and 9-b) is determined firstly, and then a straight line along the vertical direction to ridge line is drawn through the detail point. Two intersections of the straight line and the adjacent ridge lines are called projection points, and the ridge lines in the substructure are divided by the detail points and projection points, and reference numbers are labeled according to their relative positions and directions, as shown in FIGS. 9-a and 9-b. The original complete black lines in the figure represents the ridge lines (such as 2+3, 4+5, 1 in FIG. 9-a and 4+5, 3+1, 3+2, 6+7 in FIG. 9-b). The end points or bifurcation points inside the ridge lines represent the detail points (as shown by the black dots in FIGS. 9-a and 9-b). The white points in the figures are the projection points. The ridge lines are divided by the detail points or projection points to obtain the sub-ridge lines (as shown in 2, 3, 1, 4, 5 in FIG. 9-a and 4, 5, 3, 1, 2, 6, 7 in FIG. 9-b).

In an exemplary embodiment of the present disclosure, if two substructures meet any one or more of the following conditions, they are able to be determined to match each other: 1. the types of the detail points are the same, and the labels of the corresponding sub-ridge lines are the same; 2. the types of the detail points are different, but the labeling relationship of the sub-ridge lines is one of the given two relationships (as shown in FIG. 9-c); 3. the similarity of the corresponding sub-ridge lines is greater than a certain similarity threshold, and the average similarity of all sub-ridge lines is greater than a certain similarity threshold. Then, the most matching N pairs may be selected from all matching substructures, and the overall affine transformation between the most matching N pairs may be estimated by the least square method to complete the alignment of the two fingerprint images.

In an exemplary embodiment of the present disclosure, ideally, the original matching detail point pairs and substructure pairs should completely overlap after the alignment transformation, but in fact, due to errors in the extraction process of the detail points and errors between the alignment transformation and the real physical transformation, the detail point pairs and substructure pairs are not able to be completely matched. Therefore, a more stable matching scheme may be used to calculate the similarity between fingerprints. The following two aspects may be mainly taken into account: 1. detail point pair: a reference detail point may be firstly selected and all other detail points are converted to a polar coordinate which takes the reference detail point as the origin point; then all detail points may be connected to form a feature string in ascending order of angle; finally, the edit distance between the feature string of the fingerprint template and the feature string of the current fingerprint may be calculated, and the match scores between detail point pairs is able to be determined according to the edit distance. 2. substructure pairs: it is possible to traverse the most matching N pairs of substructures obtained when the fingerprints are aligned. The corresponding ridge lines in each pair of substructures form the initial matched ridge line pairs, and the ridge lines adjacent to the matched ridge line pairs form a new matched ridge line pair, thereby obtaining a set of matched ridge line pairs of two fingerprints. For any pair of matched ridge line pairs, they are able to be aligned by the transformation of the substructure pair where they are located or the transformation of the substructure pairs where the ridge line pairs which generates the any pair of matched ridge line pairs are located, and then the best matching sequence is able to be calculated by dynamic programming to obtain the number of matched points between the matched ridge line pairs. At the same time, for the detail points in a substructure pair, if the distance between the detail points and the matched points in the matched ridge line pair is less than a certain distance threshold, and the period of the ridge lines adjacent to the detail point and the period of the ridge lines adjacent to the corresponding detail point are close to each other (for example, smaller than a preset difference threshold), it is able to be considered that the detail point pairs match each other. Finally, the matching scores between the substructure pairs are able to be obtained according to the proportion of the matched points on the matched ridge line pairs and the proportion of the matched detail points in the matched substructure pairs. The matching scores of the detail point pairs and the matching scores of the substructure pairs are able to be combined to obtain the final similarity between the two fingerprint images. Thus, it is possible to determine whether the two fingerprints are matched successfully by comparing the final similarity with a preset similarity threshold.

Figure 10:
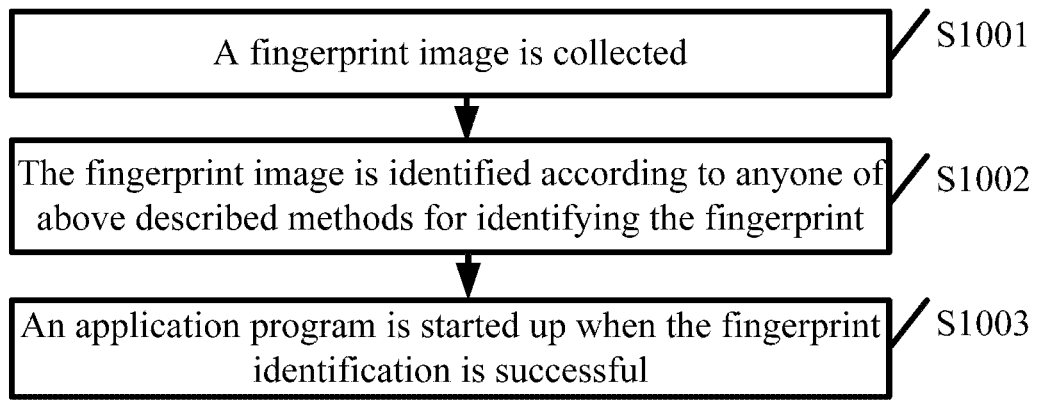
FIG. 10 is a flowchart diagram of a method for starting-up an application program based on fingerprint identification according to an embodiment of the present disclosure.

According to another aspect of the embodiments of the present disclosure, a method for starting up an application program based on fingerprint identification is also provided. As shown in FIG. 10, the method may include steps S1001 to S1003.

At step S1001, a fingerprint image is collected.

At step S1002, the fingerprint image is identified according to anyone of above described methods for identifying the fingerprint.

At step S1003, an application program is started up when the fingerprint identification is successful.

In an exemplary embodiment of the present disclosure, the method may further include detecting whether a touch operation of a finger on the touch screen meets a preset condition for starting up the step of collecting the fingerprint image before the fingerprint image is collected.

In an exemplary embodiment of the present disclosure, the application program may be a computer program that allows only authorized person to access for protecting user privacy, personal information, or confidential information of a company or an organization.

In an exemplary embodiment of the present disclosure, the method may also complete authentication while starting up the application program.

In an exemplary embodiment of the present disclosure, the user identity information corresponding to the application program and the fingerprint may be collected while the application program is successfully started up after fingerprint identification is successful, for big data analysis. For example, the user's preferences and habits may be analyzed by collecting information such as the frequency and time of the user's use of the application program, which is able to help the application developer make market planning.

In the traditional application startup method, the application program is firstly started up by clicking or touching through fingers, and then when the application program prompts for fingerprint identification, the finger should be pressed on the specific fingerprint identification area again to complete the identity authentication. It can be seen that in this traditional method, at least two steps are required to start up the application program and complete the authentication. The operation is tedious and time-consuming, which reduces the user experience to a certain extent. In the embodiments of the present disclosure, through the above steps, when a finger clicks, touches, or approaches the screen, the identity authentication can be completed at the same time as the application program is started up, so as to confirm that the user has the right to perform corresponding operations on the application program and provide secure access to the application program (for example, secure financial transactions).

Figure 11:
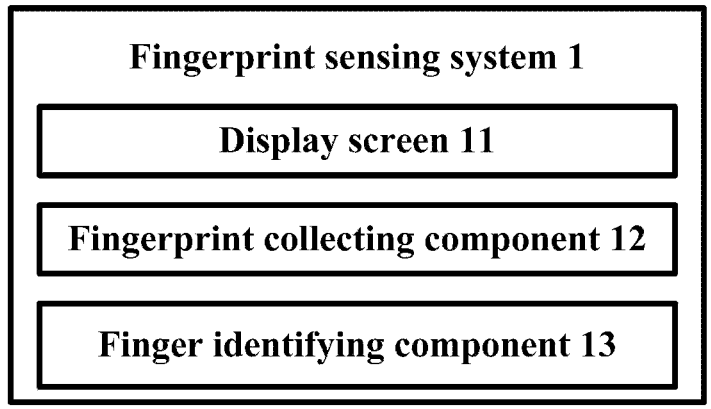
FIG. 11 is a structural block diagram of a fingerprint sensing system according to an embodiment of the present disclosure.

According to another aspect of the embodiments of the present disclosure, a fingerprint sensing system 1 is provided, as shown in FIG. 11, the fingerprint sensing system may include: a display screen 11, a fingerprint collecting component 12 and a finger identifying component 13.

The display screen 11 may include a light-emitting display element, wherein the light-emitting display element is configured to display a picture.

In an exemplary embodiment of the present disclosure, the light-emitting display element may be a self-emitting display element, such as a light-emitting diode (LED), an organic light-emitting diode (OLED), or a micro-LED. In other alternative embodiments, the light-emitting display element may also be a passive light-emitting display element, such as a liquid crystal display (LCD).

The fingerprint collecting component 12, arranged at least in a local area below the display screen, is configured to collect a fingerprint image In an exemplary embodiment of the present disclosure, due to the limited space of portable or wearable devices, it is generally desirable to maximize the display area as much as possible. Therefore, the fingerprint collecting component may be set at least in the local area below the display screen to reduce the occupation of the display area.

The fingerprint identifying component 13 is configured to receive the fingerprint image and adopt the above described method for identifying the fingerprint, to perform fingerprint identification on the fingerprint image.

Figure 12:
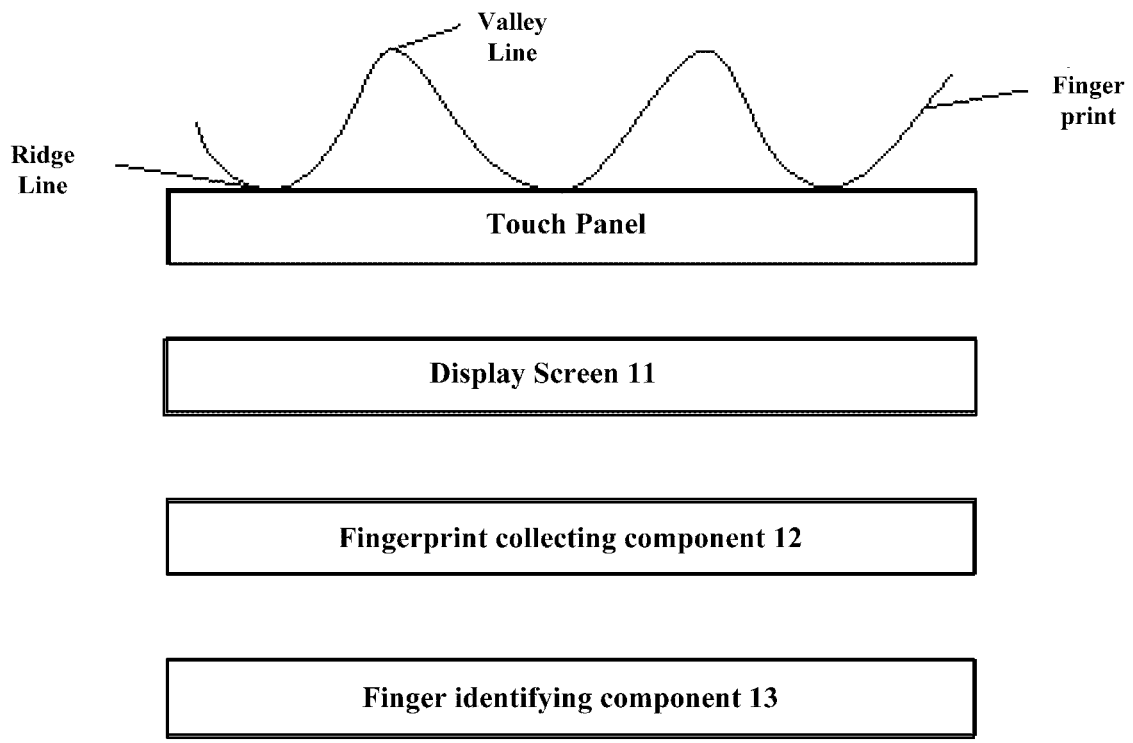
FIG. 12 is a structural block diagram of the fingerprint sensing system including the touch panel according to an embodiment of the present disclosure.

In an exemplary embodiment of the present disclosure, the display screen 11 may be a touch display screen, which can not only perform screen display, but also detect the operation of the user's finger (such as touching, pressing, or approaching the display screen), so as to provide the user with a human-computer interaction interface. For example, in one embodiment, as shown in FIG. 12, the fingerprint sensing system may further include a touch panel (TP). The touch panel may be disposed on the surface of the display screen, or may be partly or entirely integrated into the display screen to form a touch display.

In an exemplary embodiment of the present disclosure, the fingerprint sensing system 1 may further include a cover plate, which is disposed above the display screen and serves as an interface for the user to touch and display the screen, to protect the display screen. The cover plate may be glass or sapphire, and is not limited thereto.

In a first exemplary embodiment of the present disclosure regarding the composition structure of the fingerprint collecting component 12 of the present disclosure, the fingerprint collecting component 12 may include an optical collimator and a photo detector. With the optical collimator, only light with an incident angle smaller than a preset angle can reach the photo detector.

In a second exemplary embodiment of the present disclosure regarding the composition structure of the fingerprint collecting component 12, the fingerprint collecting component 12 may include a lens and an imaging element, wherein the imaging element may be disposed below the lens and be configured to directly obtain the fingerprint image on the display screen based on the lens imaging principle. In an example embodiment, a convex lens may be used as the lens. According to the needs of practical applications, one or more lenses and imaging elements may be respectively disposed below the display, so as to realize fingerprint collection and identification in a local area of the screen, half screen or full screen. The lenses and the imaging elements may be independent components or integrated components. When the lenses and the imaging elements are independent of each other, the number of the lens and the number of the imaging elements are not necessarily one-to-one correspondence.

Figure 13:
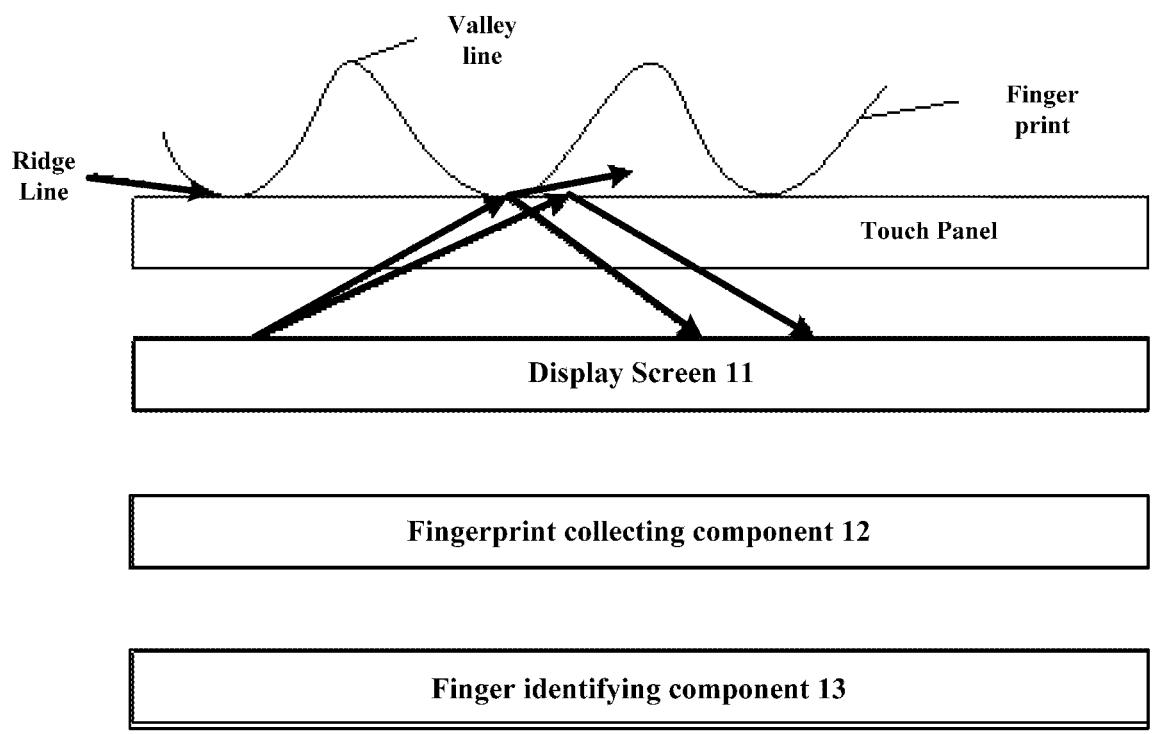
FIG. 13 is a flowchart diagram of a method for obtaining the fingerprint diagram by detecting light emitted from the display screen and light reflected on the surface of the finger and back to the display screen according to an embodiment of the present disclosure.

In a third exemplary embodiment of the present disclosure regarding the composition structure of the fingerprint collecting component 12, the fingerprint collecting component is configured to obtain a fingerprint image by detecting light emitted from the display screen and light reflected on the surface of the finger back to the display screen. According to at least one alternative embodiment, the fingerprint collecting component may include a first photoelectric sensor, and the first photoelectric sensor may obtain a fingerprint image by detecting light emitted from the display screen and light reflected on the surface of the finger back to the display screen. As shown in FIG. 13, at the place far enough from a lit light-emitting display element in the display screen, the refractive index at the ridge line of the fingerprint is greater than the refractive index at the valley line of the fingerprint, so a total reflection is formed at a fingerprint valley line but not at the fingerprint ridge line, a part of the light will be transmitted to the inside of the finger, which will cause the intensity of the reflected light at the fingerprint valley line to be greater than the intensity of the reflected light at the fingerprint ridge line. The fingerprint ridge line and the fingerprint valley line may be determined by detecting the intensity of these light reflected back to the display screen, so as to obtain a fingerprint image. However, in this solution, because the excitation light is the light from the built-in light-emitting display element and the intensity of the reflected light needs to be detected, due to the large effect of ambient light, the clarity of the fingerprint image will be reduced when the difference in the intensity of the reflected light is small.

Figure 14:
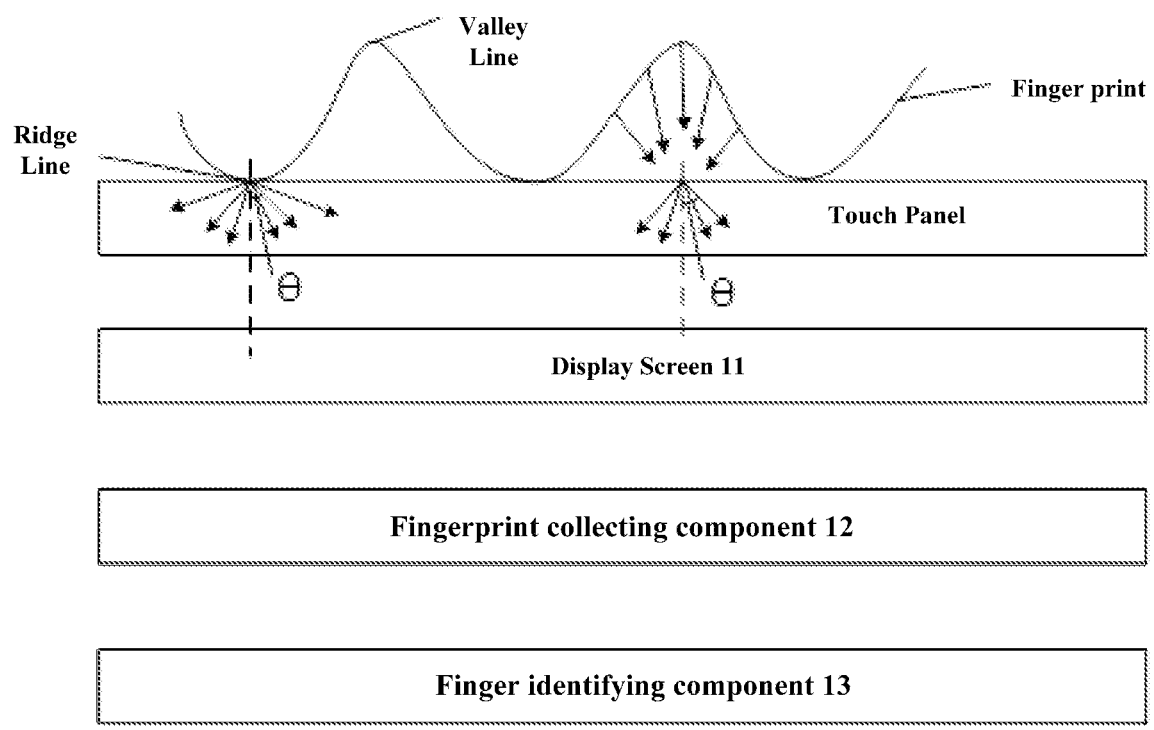
FIG. 14 is a flowchart diagram of a method for obtaining the fingerprint diagram by detecting the light penetrating through the display screen from the finger according to an embodiment of the present disclosure.

In a fourth exemplary embodiment of the present disclosure regarding the composition structure of the fingerprint collecting component 12, as shown in FIG. 14, the fingerprint collecting component 12 may also obtain a fingerprint image by detecting the light that penetrates the display screen from a finger. As at least one alternative embodiment, when a light with a refraction angle greater than a first threshold is detected, the light is determined as the ridge line of the fingerprint, otherwise the light is determined as the valley line of the fingerprint, and the fingerprint image is obtained according to the ridge line and the valley line of the fingerprint. The first threshold may be a refraction angle at a valley line of the fingerprint. As an alternative embodiment, the fingerprint collecting component 12 may include a light path guiding component for guiding light with a refraction angle greater than a first threshold. The fingerprint collecting component 12 may further include a photoelectric sensor (a second photoelectric sensor). The second photoelectric sensor may be configured to determine the ridge line of the fingerprint when the light having the refraction angle greater than the first threshold is detected, otherwise the valley line of the fingerprint is determined, so as to obtain the fingerprint image. The second photoelectric sensor may be a complementary metal oxide semiconductor CMOS sensor, a thin film transistor TFT sensor, or other customized sensors. In this embodiment, since the excitation light is the ambient light itself, the acquisition of the fingerprint image is not affected by the ambient light. In theory, the stronger the ambient light, the better the collection effect of fingerprints. In addition, when the ambient light is insufficient, the intensity of the light can be enhanced by lighting built-in light-emitting display elements of the display screen around the finger or by lighting an external light source.

It can be known from the above exemplary embodiments of the present disclosure that, because the fingerprint sensing system is located below the display screen, the display area of the display screen may be extended to the entire surface of the electronic device. In addition, the fingerprint sensing system may be set in a partial area or the entire area below the display screen, thereby realizing fingerprint recognition in a local area, a half screen, or a full screen. In the prior art, the fingerprint sensing system is usually set in an area outside the display screen and the contact area with the finger is small, such as the Apple iPhone 6, which has great restrictions on the recognition objects and recognition methods, and is not suitable for collecting large recognition patterns (for example, palm prints), and it is not suitable for simultaneous recognition and verification of multiple recognition objects. With the technical solution of the embodiment of the present disclosure, since one or more independent or integrated fingerprint sensing systems may be set in the local area, the half-screen area, or the full-screen area below the display screen, large patterns (for example, palm print) can be collected and identified to expand the application scene; and multiple recognition objects can be identified and verified at the same time to enhance the security of the application program. For example, a financial payment application may be set to open and complete the payment when the fingerprints of two people are both successfully identified and verified, and a full-screen fingerprint identification may be set so that two people's fingers are able to touch any area of the display screen at the same time.

In the exemplary embodiments of the present disclosure, the technical solutions of the embodiments of the present disclosure may be applied to various electronic devices with display screens, such as portable or wearable electronic devices like smartphones, notebook computers, tablet computers, digital cameras, game consoles, smart bracelets, smart phones, etc, and other electronic devices like automated teller machines (ATMs), information management systems, electronic door locks, etc.

In the exemplary embodiment of the present disclosure, the technical solutions of the embodiment of the present disclosure may also perform other biometric identification besides fingerprint identification, which is not limited in the embodiment of the present disclosure.

Figure 15:
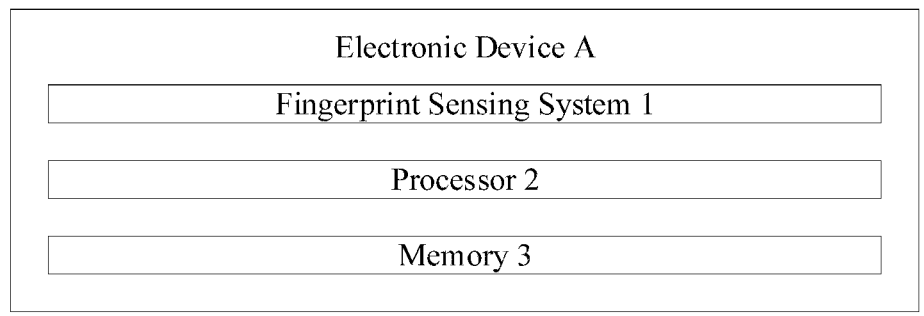
FIG. 15 is a structural block diagram of an electronic device according to an embodiment of the present disclosure.

According to another aspect of the embodiments of the present disclosure, an electronic device A is further provided. As shown in FIG. 15, the electronic device may include:

a processor 2; and a memory 3, configured to store executable instructions of the processor 2;

wherein the processor 2 is configured to execute the executable instructions according to any one of above described methods for identifying the fingerprint.

In an exemplary embodiment of the present disclosure, as shown in FIG. 15, the electronic device A may further include any one of the above described fingerprint sensing system 1.

According to another aspect of the embodiments of the present disclosure, a storage medium with stored program is also provided, wherein when the program runs, the device where the storage medium is located is controlled to execute any one of the above described methods for identifying the fingerprint.

The embodiments of the present disclosure include at least the following beneficial effects:
1. Only few times of fingerprint collections are taken to complete identity registration, which is convenient and fast.
2. Fingerprint identification can be performed at any position on the mobile phone screen, which is flexible and free.
3. Fingerprint identification, application starting up, and identity verification can be implemented in one step in application design.
4. Identification effect for distorted and deformed fingerprints are good, stable and reliable.

Those of ordinary skill in the art can understand that all or some of the steps, systems, and functional modules/units in the devices disclosed in the methods above can be implemented as software, firmware, hardware, and appropriate combinations thereof. In a hardware implementation, the division between functional modules/units mentioned in the above description does not necessarily correspond to the division of physical components; for example, one physical component may have multiple functions, or one function or step may be cooperatively executed by several components. Some or all components may be implemented as software executed by a processor, such as a digital signal processor or microprocessor, or as hardware, or as an integrated circuit, such as an application specific integrated circuit. Such software may be distributed on computer-readable media, which may include computer storage media (or non-transitory media) and communication media (or transitory media). As is known to those of ordinary skill in the art, the term computer storage medium includes volatile and non-volatile, removable and non-removable medium implemented in any method or technology used to store information, such as computer-readable instructions, data structures, program modules or other data. Computer storage medium includes, but is not limited to, RAM, ROM, EEPROM, flash memory or other memory technologies, CD-ROM, digital versatile disk (DVD) or other optical disk storage, magnetic cartridges, magnetic tape, disk storage or other magnetic storage devices, or any other medium used to store desired information and which can be accessed by a computer. In addition, it is well known to those of ordinary skill in the art that a communication medium typically contains computer-readable instructions, data structures, program modules, or other data in a modulated data signal such as a carrier wave or other transmission mechanism, and may include any information delivery medium.

What is claimed is:

1. A method for enhancing a fingerprint image, comprising:
    eliminating a background texture of a fingerprint image of a current frame to obtain a pure fingerprint image;
    performing a first pre-processing on the pure fingerprint image to obtain a first pre-processed image;
    acquiring an effective area of the first pre-processed image;
    performing direction field estimation and direction field correction on the effective area; and
    performing a second pre-processing on the effective area after the direction field correction to obtain an enhanced fingerprint image;
    wherein when the enhanced fingerprint image is a distorted fingerprint image, the method further comprising: performing the distortion correction on the distorted fingerprint image comprises; wherein performing the distortion correction on the distorted fingerprint image comprises: extracting a direction field and a periodic diagram of the distorted fingerprint image; searching for according to the direction field and the periodic diagram, a reference distorted fingerprint in a database set, closest to the distorted fingerprint image; and performing inverse transformation correction on the distorted fingerprint image according to the reference distorted fingerprint.

2. The method according to claim 1, wherein a pixel value of the background texture is an average pixel value of fingerprint images of N frames before the fingerprint image of the current frame, wherein N is a positive integer.

3. The method according to claim 1, wherein eliminating the background texture of the fingerprint image of the current frame to obtain the pure fingerprint image comprises:
    performing in the fingerprint image of the current frame, pixel-by-pixel subtraction on the background texture to obtain the pure fingerprint image.

4. The method according to claim 1, before eliminating the background texture of the fingerprint image of the current frame, further comprising: performing local color transfer on the fingerprint image of the current frame and the background texture.

5. The method according to claim 1, wherein the first pre-processing comprises enhancing contrast and/or denoising on the pure fingerprint image.

6. The method according to claim 1, wherein acquiring the effective area of the first pre-processed image adopts a predetermined fingerprint foreground segmentation algorithm.

7. The method according to claim 1, wherein the second pre-processing comprises:
    denoising the effective area;
    obtaining a binarized image; and
    refining a fingerprint ridge line in the binarized image to obtain the enhanced fingerprint image.

8. A method for identifying a fingerprint, comprising:
    performing enhancement processing on a collected fingerprint image of a current frame to obtain an enhanced fingerprint image, wherein the enhancement processing comprises: eliminating a background texture of the fingerprint image of the current frame to obtain a pure fingerprint image;
    performing feature extraction on the enhanced fingerprint image to obtain feature data; and
    identifying the fingerprint according to comparison of the feature data with feature data of a fingerprint template;
    wherein when the enhanced fingerprint image is a distorted fingerprint image, the method further comprising: performing the distortion correction on the distorted fingerprint image comprises; wherein performing the distortion correction on the distorted fingerprint image comprises: extracting a direction field and a periodic diagram of the distorted fingerprint image; searching for according to the direction field and the periodic diagram, a reference distorted fingerprint in a database set, closest to the distorted fingerprint image; and performing inverse transformation correction on the distorted fingerprint image according to the reference distorted fingerprint.

9. The method according to claim 8, wherein the enhancement processing further comprises:
    performing a first pre-processing on the pure fingerprint image to obtain a first pre-processed image;
    acquiring an effective area of the first pre-processed image;

performing direction field estimation and direction field correction on the effective area; and performing a second pre-processing on the effective area after the direction field correction to obtain the enhanced fingerprint image.

10. The method according to claim 8, wherein, a pixel value of the background texture is an average pixel value of fingerprint images of N frames before the fingerprint image of the current frame, where N is a positive integer.

11. The method according to claim 8, wherein eliminating the background texture of the fingerprint image of the current frame to obtain the pure fingerprint image comprises:

performing in the fingerprint image of the current frame, pixel-by-pixel subtraction on the background texture to obtain the pure fingerprint image.

12. The method according to claim 8, before eliminating the background texture of the fingerprint image of the current frame, further comprising: performing local color transfer on the fingerprint image of the current frame and the background texture.

13. The method according to claim 8, before performing feature extraction on the enhanced fingerprint image, further comprising:

performing fingerprint distortion detection on the fingerprint enhanced image to determine that the enhanced fingerprint image is a normal fingerprint image or a distorted fingerprint image; and performing distortion correction on the distorted fingerprint image.

14. The method according to claim 13, wherein performing the fingerprint distortion detection on the enhanced fingerprint image comprises:

performing classification by inputting the enhanced fingerprint image to a classifier, wherein a classification result comprises the normal fingerprint image and the distorted fingerprint image.

15. The method according to claim 8, wherein the feature data comprises a detail point feature and/or a ridge feature of a fingerprint ridge.

16. The method according to claim 8, wherein identifying the fingerprint according to comparison of the feature data with feature data of the fingerprint template comprises:

calculating a feature similarity between the feature data and the feature data of the fingerprint template; and when the feature similarity is greater than or equal to a threshold, completing the fingerprint identification.

17. A method for starting up an application program based on fingerprint identification, comprising:

collecting a fingerprint image;

performing fingerprint identification on the fingerprint image by adopting the method for identifying the fingerprint according to claim 8;

starting up the application program when the fingerprint is identified correctly.

18. The method according to claim 17, before collecting the fingerprint image, further comprising: detecting whether a touch operation of a finger on a touch screen satisfies a preset condition for starting up collecting the fingerprint image.

19. The method according to claim 17, further comprising: completing identity verification while starting up the application program.

\* \* \* \* \*